(12) United States Patent
Egenter et al.

(10) Patent No.: US 12,507,325 B2
(45) Date of Patent: Dec. 23, 2025

(54) METHOD FOR OPERATING A KITCHEN APPLIANCE, AND KITCHEN APPLIANCE

(71) Applicant: E.G.O. Elektro-Geraetebau GmbH, Oberderdingen (DE)

(72) Inventors: Christian Egenter, Bretten (DE); Max-Felix Mueller, Oberderdingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 780 days.

(21) Appl. No.: 17/813,655

(22) Filed: Jul. 20, 2022

(65) Prior Publication Data

US 2023/0021823 A1 Jan. 26, 2023

(30) Foreign Application Priority Data

Jul. 26, 2021 (DE) ...................... 10 2021 208 013.8

(51) Int. Cl.
*H05B 6/06* (2006.01)
(52) U.S. Cl.
CPC ................... *H05B 6/065* (2013.01)
(58) Field of Classification Search
CPC ...................................................... H05B 6/065
See application file for complete search history.

(56) References Cited

U.S. PATENT DOCUMENTS

| 7,910,865 | B2 | 3/2011 | Haag et al. | |
| 8,658,950 | B2 * | 2/2014 | Cho | H05B 3/12 219/626 |

(Continued)

FOREIGN PATENT DOCUMENTS

| EP | 2506665 A2 | 10/2012 | |
| GB | 2348750 A * | 10/2000 | ............. H05B 6/065 |

(Continued)

OTHER PUBLICATIONS

German Patent and Trademark Office, Office Action received for Application No. DE 102021208013.8, dated May 19, 2022, 10 pages.

(Continued)

*Primary Examiner* — Woody A Lee, Jr.
(74) *Attorney, Agent, or Firm* — Alston & Bird LLP

(57) ABSTRACT

Method for operating a kitchen appliance (100), the kitchen appliance (100) having:
  a rectifier (1) for producing a DC voltage (UG) from a grid voltage (UN),
  a first inverter (2) which is powered by the DC voltage (UG) and which is designed to generate a first control signal (AS1) having a first frequency (f1),
  a first coil (3) which is controlled by means of the first control signal (AS1) and by means of which an alternating magnetic field is able to be generated for heating a cooking vessel (4) and/or for transferring energy in the direction of an electrical load (5) by means of inductive coupling,
  a second inverter (6) which is powered by the DC voltage (UG) and which is designed to generate a second control signal (AS2) having a second frequency (f2), and
  a second coil (7) which is controlled by means of the second control signal (AS2) and by means of which an alternating magnetic field is able to be generated for heating a cooking vessel (8) and/or for transferring energy in the direction of an electrical load (9) by means of inductive coupling,
  the method having the step of:
  controlling the first inverter (2) and the second inverter (6) in such a way that the first frequency (f1) and the second frequency (f2) are dependent on each other.

7 Claims, 1 Drawing Sheet

(56) References Cited

U.S. PATENT DOCUMENTS

Figure 1:
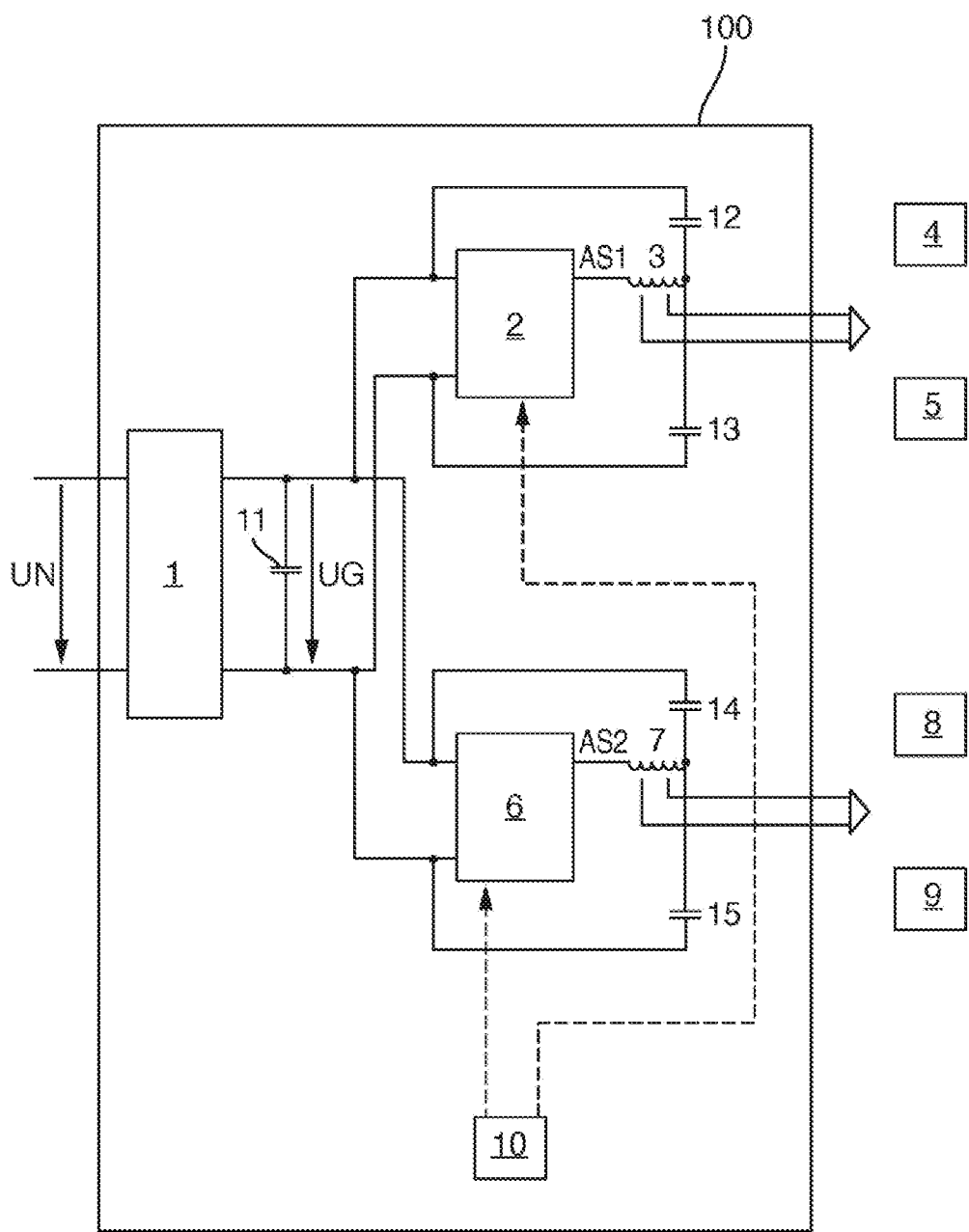

2010/0237065 A1    9/2010   Cho et al.
2021/0105871 A1    4/2021   Kim et al.
2022/0256660 A1*   8/2022   Lee ..................... H05B 6/1245

FOREIGN PATENT DOCUMENTS

JP         2012043634 A  *  3/2012   ............. H05B 6/065
JP         2019-175691 A    10/2019
WO    WO 2006/117182 A1    11/2006

OTHER PUBLICATIONS

European Patent Office, Extended European Search Report received for Application No. 22186243.6, dated Dec. 8, 2022, 8 pages, Germany.

* cited by examiner

METHOD FOR OPERATING A KITCHEN APPLIANCE, AND KITCHEN APPLIANCE

CROSS-REFERENCE TO RELATED APPLICATIONS

This application claims priority to German Application No. 10 2021 208 013.8, filed Jul. 26, 2021, the contents of which are hereby incorporated herein in its entirety by reference.

The invention relates to a method for operating a kitchen appliance and to a kitchen appliance.

The object of the invention is to provide a method for operating a kitchen appliance and a kitchen appliance which allow operation with as little noise as possible.

The method is used to operate a kitchen appliance.

The kitchen appliance has a conventional single-phase or poly-phase rectifier for producing a DC voltage from a single-phase or poly-phase grid voltage, or grid AC voltage.

The kitchen appliance further has a conventional first inverter which is powered by the DC voltage and which is designed to generate a first control signal having a first frequency. The first control signal is preferably a pulse-width-modulated (square-wave) signal having a variable frequency and a variable duty cycle.

The kitchen appliance further has a conventional first coil which is controlled by means of the first control signal and by means of which an alternating magnetic field is able to be generated for heating a cooking vessel and/or for transferring energy in the direction of an electrical load by means of inductive coupling. In this respect, reference is also made to the relevant technical literature.

The kitchen appliance further has a conventional second inverter which is powered by the DC voltage and which is designed to generate a second control signal having a second frequency different from the first frequency. The second control signal is preferably a pulse-width-modulated (square-wave) signal having a variable frequency and a variable duty cycle.

The kitchen appliance further has a second coil which is controlled by means of the second control signal and by means of which an alternating magnetic field is able to be generated for heating a cooking vessel and/or for transferring energy in the direction of an electrical load by means of inductive coupling.

The kitchen appliance further has a control unit, for example in the form of a microprocessor controller, for controlling the first inverter and the second inverter, the control unit controlling the first inverter and the second inverter in such a way that a method as described below is performed.

According to the invention, the first inverter and the second inverter are controlled in such a way that the first frequency and the second frequency are dependent on each other.

In one embodiment, the first inverter and the second inverter are controlled in such a way that the second frequency is an integer multiple of the first frequency.

In one embodiment, the first inverter and the second inverter are controlled in such a way that the second frequency is twice the first frequency.

In one embodiment, one of the frequencies is set on the basis of an associated heating power or an associated power which is to be transferred and the other of the two frequencies is adjusted on the basis of the set frequency.

In one embodiment, a duty cycle of the control signal having the adjusted frequency is set on the basis of an associated heating power or an associated power which is to be transferred.

In one embodiment, the first frequency or the second frequency lies in a frequency range between 18 kHz and 37 kHz.

In one embodiment, the kitchen appliance has an intermediate circuit capacitor which is designed to buffer the DC voltage.

The respective inverter in conjunction with the associated coil preferably forms a so-called conventional induction heating device for heating the cooking vessel or a so-called Ki (cordless kitchen) transmitter for transferring energy in the direction of the electrical load, or Ki receiver, by means of inductive coupling, i.e. a Ki transmitter for so-called WPT operation.

If a plurality of inverters, or converters, are operated using the same rectifier, or intermediate circuit, at different frequencies f1 and f2, this results in the frequencies being mixed at the intermediate circuit capacitor, and the frequencies f1+f2 and f1−f2 arise.

This leads to a beat in the audible range. In order to avoid these beats, conventionally the frequencies of all inverters using the same intermediate circuit are selected to be identical and the applicable powers of the inverters are set by controlling the duty cycle.

According to the invention, interference between different inverters is instead avoided by operating the second inverter at exactly twice the frequency, because then even interference having arbitrary reciprocal harmonics remains in the inaudible range. The reason is that the frequencies of the second converter and the harmonic thereof are all at harmonics of the first frequency and therefore at least at an interval from the first frequency; there can thus never be resultant beats in the frequency range below the first frequency. The lower frequency must of course lie outside of the audible range here.

According to the invention, interference in particular when the induction heating device and the Ki transmitter are operated in parallel can be avoided, since the Ki transmitter is preferably operated at a frequency having a level at which the induction heating device would be limited to powers that are too low. The first, i.e. lower, frequency is therefore typically used for the induction heating device and the second frequency, i.e. the frequency which is twice the first frequency, is used for the Ki transmitter.

The frequency for the Ki transmitter, i.e. typically the second frequency, often depends on the design of the Ki transmitter and of the Ki receiver, i.e. is not freely selectable. The frequency for the Ki transmitter can then be predefined and the frequency for the induction heating device, i.e. the first frequency, can be adjusted in such a way that it equates to half the frequency of the Ki transmitter. To set the power of the induction heating device, given a constant first frequency, the duty cycle can then be selected on the basis of the desired power.

If, however, the frequency for the operation of the induction heating device cannot be changed and/or the required frequency of the induction heating device would be unsuitable for the Ki transmitter, the frequency of the induction heating device can be predefined instead and the frequency of the Ki transmitter can be adjusted in such a way that it equates to twice the frequency of the induction heating device.

According to the invention, parallel operation of a Ki transmitter and an induction heating device using the same intermediate circuit is therefore possible, suitable selection of the frequency of the Ki transmitter and of the frequency of the induction heating device meaning that no interference, or beats, is/are audible, even when the frequencies are different.

The invention is described in detail below with reference to the drawing, in which: FIG. 1 shows a kitchen appliance according to the invention for the low-noise parallel operation of induction heating devices and Ki transmitters.

FIG. 1 shows a kitchen appliance 100 for the low-noise parallel operation of two induction heating devices, or two Ki transmitters or one Ki transmitter and one induction heating device.

The kitchen appliance 100 has a conventional rectifier 1 for producing a DC voltage UG from a grid voltage UN. The DC voltage UG forms an intermediate circuit voltage in conjunction with at least one intermediate circuit capacitor 11 for short-circuiting the high-frequency currents of the inverters 2, 6.

The kitchen appliance 100 further has a first inverter 2 which is powered by the DC voltage UG and which is designed to generate a first square-wave pulse-width-modulated control signal AS1 having a first frequency f1. The kitchen appliance 100 further has a first coil 3 which is controlled by means of the first control signal AS1 and by means of which an alternating magnetic field is able to be generated for heating a cooking vessel 4 and/or for transferring energy in the direction of an electrical load 5 by means of inductive coupling. The first coil 3, in conventional circuitry, is electrically connected by way of one of its terminals to a connecting node between two capacitors 12 and 13, the two capacitors 12 and 13 being connected in series and having the DC voltage UG applied to them. The first inverter 2, the first coil 3 and the capacitors 12 and 13 are therefore part of a first induction heating device or a first Ki transmitter.

The kitchen appliance 100 further has a second inverter 6 which is powered by the DC voltage UG and which is designed to generate a second square-wave pulse-width-modulated control signal AS2 having a second frequency f2. The kitchen appliance 100 further has a second coil 7 which is controlled by means of the second control signal AS2 and by means of which an alternating magnetic field is able to be generated for heating a cooking vessel 8 and/or for transferring energy in the direction of an electrical load 9 by means of inductive coupling. The second coil 7, in conventional circuitry, is electrically connected by way of one of its terminals to a connecting node between two capacitors 14 and 15, the two capacitors 14 and 15 being connected in series and having the DC voltage UG applied to them. The second inverter 6, the second coil 7 and the capacitors 14 and 15 are therefore part of a second induction heating device or a second Ki transmitter.

The kitchen appliance 100 further has a control unit 10 for controlling the first inverter 2 and the second inverter 6.

The control unit 10 controls the first inverter 2 and the second inverter 6 in such a way that the second frequency f2 is twice the first frequency f1, i.e. the following applies: f2=2×f1

Typically, the frequency f2 is set, or predefined, on the basis of a power which is to be transferred and the frequency f1 is adjusted such that f1=f2/2.

A duty cycle of the control signal AS1 is set on the basis of an associated heating power. The duty cycle of the control signal AS2 is typically set to be constantly 50%.

The first frequency f1 typically lies in a frequency range between 18 kHz and 37 kHz.

The invention claimed is:

1. A method for operating a kitchen appliance (100), the kitchen appliance (100) having:
   a rectifier (1) for producing a DC voltage (UG) from a grid voltage (UN),
   a first inverter (2) which is powered by the DC voltage (UG) and which is configured to generate a first control signal (AS1) having a first frequency (f1),
   a first coil (3) which is controlled by means of the first control signal (AS1) and by means of which an alternating magnetic field is generated at least one of for heating a cooking vessel (4) or for transferring energy in the direction of an electrical load (5) by means of inductive coupling,
   a second inverter (6) which is powered by the DC voltage (UG) and which is configured to generate a second control signal (AS2) having a second frequency (f2), and
   a second coil (7) which is controlled by means of the second control signal (AS2) and by means of which an alternating magnetic field is generated for transferring energy in the direction of an electrical load (9) by means of inductive coupling, wherein the second inverter (6) in conjunction with the second coil (7) forms a Ki (cordless kitchen) transmitter,
   wherein the method has the step of:
   controlling the first inverter (2) and the second inverter (6) in such a way that the second frequency (f2) is an integer multiple of the first frequency (f1).

2. The method as claimed in claim 1, wherein the first inverter (2) and the second inverter (6) are controlled in such a way that the second frequency (f2) is twice the first frequency (f1).

3. The method as claimed in claim 1, comprising the step of setting one of the frequencies on the basis of an associated heating power or an associated power which is to be transferred and adjusting the other of the two frequencies on the basis of the set frequency.

4. The method as claimed in claim 3, comprising the step of setting a duty cycle of the control signal having the adjusted frequency on the basis of an associated heating power or an associated power which is to be transferred.

5. The method as claimed in claim 1, wherein the first frequency (f1) or the second frequency (f2) lies in a frequency range between 18 kHz and 37 kHz.

6. A kitchen appliance (100), having:
   a rectifier (1) for producing a DC voltage (UG) from a grid voltage (UN),
   a first inverter (2) which is powered by the DC voltage (UG) and which is configured to generate a first control signal (AS1) having a first frequency (f1),
   a first coil (3) which is controlled by means of the first control signal (AS1) and by means of which an alternating magnetic field is generated at least one of for heating a cooking vessel (4) or for transferring energy in the direction of an electrical load (5) by means of inductive coupling,
   a second inverter (6) which is powered by the DC voltage (UG) and which is configured to generate a second control signal (AS2) having a second frequency (f2),
   a second coil (7) which is controlled by means of the second control signal (AS2) and by means of which an alternating magnetic field is generated for transferring energy in the direction of an electrical load (9) by means of inductive coupling, wherein the second inverter (6) in conjunction with the second coil (7) forms a Ki (cordless kitchen) transmitter, and a control unit (10) for controlling the first inverter (2) and the second inverter (6), the control unit (10) controlling the first inverter (2) and the second inverter (6) in such a way that a method for operating the kitchen appliance (100) comprises: controlling the first inverter (2) and the second inverter (6) in such a way that the second frequency (f2) is an integer multiple of the first frequency (f1).

7. The kitchen appliance (100) as claimed in claim 6, wherein the kitchen appliance (100) has at least one intermediate circuit capacitor (11).

* * * * *